United States Patent
Maseedu et al.

(10) Patent No.: US 11,726,903 B2
(45) Date of Patent: *Aug. 15, 2023

(54) ZERO CODING AUTOMATION WITH NATURAL LANGUAGE PROCESSING, SUCH AS FOR USE IN TESTING TELECOMMUNICATIONS SOFTWARE AND RESOURCES

(71) Applicant: T-Mobile USA, Inc., Bellevue, WA (US)

(72) Inventors: Phaneendra Maseedu, Everett, WA (US); Sandeep Talwar, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,217

(22) Filed: Aug. 13, 2021

(65) Prior Publication Data

US 2021/0374043 A1 Dec. 2, 2021

Related U.S. Application Data

(63) Continuation of application No. 16/595,242, filed on Oct. 7, 2019, now Pat. No. 11,106,570.

(Continued)

(51) Int. Cl.
*G06F 11/36* (2006.01)
*G06F 40/226* (2020.01)

(52) U.S. Cl.
CPC ........ *G06F 11/3688* (2013.01); *G06F 40/226* (2020.01)

(58) Field of Classification Search
None
See application file for complete search history.

(56) References Cited

U.S. PATENT DOCUMENTS 5,978,940 A * 11/1999 Newman ............... H04Q 3/0087
714/712
8,347,267 B2 * 1/2013 Givoni ................ G06F 11/3664
717/124

(Continued)

FOREIGN PATENT DOCUMENTS

WO 2014115189 A1 7/2014

OTHER PUBLICATIONS

Campbell, Brock Angus, and Christoph Treude. "NLP2Code: Code snippet content assist via natural language tasks." 2017 IEEE International Conference on Software Maintenance and Evolution (ICSME). IEEE, 2017. (Year: 2017).*

(Continued)

*Primary Examiner* — Matthew J Brophy
(74) *Attorney, Agent, or Firm* — Perkins Coie LLP

(57) ABSTRACT

A framework, such as for automated testing for telecommunications software and resources is disclosed that reuses code modules, thereby reducing redundancy and increasing efficiency and productivity. The zero coding automation system disclosed herein provides an end-to-end automation framework, which minimizes (and in some cases eliminates) the requirement to write software code, e.g. to test software modules. Instead, the coding automation systems and methods provide a hierarchical framework to translate requests (e.g. testing commands, statements, and so on) received in a natural language (for example, English) to testing code modules written in, for example, one or more programming languages (for example, tool specific Application Program Interface (API)/libraries developed to test functionality).

20 Claims, 13 Drawing Sheets

Related U.S. Application Data

(60) Provisional application No. 62/744,094, filed on Oct. 10, 2018.

(56) References Cited

U.S. PATENT DOCUMENTS

| | | | | |
|---|---|---|---|---|
| 8,799,720 | B2* | 8/2014 | Lau | G06F 11/3684 |
| | | | | 714/38.1 |
| 8,887,135 | B2* | 11/2014 | Banerjee | G06F 11/3684 |
| | | | | 717/124 |
| 8,984,348 | B2* | 3/2015 | Lau | G06F 11/3684 |
| | | | | 714/38.1 |
| 9,038,026 | B2* | 5/2015 | Chandra | G06F 11/3684 |
| | | | | 717/124 |
| 9,047,414 | B1* | 6/2015 | Matyjek | G06F 11/3692 |
| 9,396,094 | B2* | 7/2016 | Browne | G06F 11/3676 |
| 9,460,075 | B2* | 10/2016 | Mungi | G06F 40/211 |
| 9,934,136 | B2* | 4/2018 | Crawshay | G06F 11/3684 |
| 10,204,035 | B1* | 2/2019 | Surace | G06F 40/174 |
| 10,545,854 | B2* | 1/2020 | Chandra | G06F 11/3672 |
| 10,978,074 | B1* | 4/2021 | Roy | G10L 15/16 |
| 11,113,175 | B1* | 9/2021 | Adamo | G06F 40/216 |
| 11,301,502 | B1* | 4/2022 | Dijamco | G06F 40/35 |
| 2007/0130112 | A1* | 6/2007 | Lin | G06F 16/41 |
| 2011/0202901 | A1* | 8/2011 | Givoni | G06F 11/3414 |
| | | | | 717/125 |
| 2013/0097586 | A1* | 4/2013 | Chandra | G06F 11/3684 |
| | | | | 717/124 |
| 2013/0227351 | A1* | 8/2013 | Lau | G06F 11/3688 |
| | | | | 714/E11.178 |
| 2013/0227366 | A1* | 8/2013 | Lau | G06F 11/3688 |
| | | | | 714/E11.159 |
| 2013/0263089 | A1* | 10/2013 | Banerjee | G06F 11/3684 |
| | | | | 717/124 |
| 2015/0082277 | A1 | 3/2015 | Champlin-scharff et al. | |
| 2016/0132426 | A1* | 5/2016 | Crawshay | G06F 11/3688 |
| | | | | 714/38.1 |
| 2016/0283353 | A1* | 9/2016 | Owen | G06F 11/3684 |
| 2017/0177466 | A1* | 6/2017 | Owen | G06F 11/3688 |
| 2017/0181012 | A1* | 6/2017 | Talwar | H04W 8/22 |
| 2018/0004637 | A1* | 1/2018 | Chandra | G06F 11/3672 |
| 2019/0042400 | A1* | 2/2019 | Surace | H04L 67/01 |

OTHER PUBLICATIONS

International Searching Authority, International Search Report and Written Opinion, PCT Patent Application PCT/US2019/055042, dated Jan. 30, 2020, 9 pages.

Sarmiento, Edgar et al. "C&L: Generating Model Based Test Cases from Natural Language Requirements Descriptions." 2014 IEEE First International Workshop on Requirements Engineering and Testing (RET). IEEE, 2014, p. 32-38.

Sinha, Avik et al. "Text2Test: Automated Inspection of Natural Language Use Cases." 2010 Third International Conference on Software Testing, Verification and Validation. IEEE, 2010, p. 155-164.

* cited by examiner

```
NETWORK_SETTINGS:
  GROUP_ID: "5"
  GROUP_NAME: "NETWORK_SETTINGS"
  STEPS_RESOURCE: "PERFECTO_REST_API_STEPS"
  PROCEDURES:
    -
      PROC_NAME: "DIAL_NETWORK_ENGINEERING_CODE"
      PROC_INFO: "Dial network Engineering Code"
      PROC_VARS:
      DUT:
        "GET_VAL: DICT_PATH:DEVICE_INFO.UE_NO"
      PROC_STEPS:
        -
          SID: "1"
          STEP_NAME: "Open_Phone"
        -
          SID: "2"
          STEP_NAME: "Open_Dialer"
        -
          SID: "3"
          STEP_NAME: "Enter_Engineering_Code"
          STEP_VARS:
            ENG_CODE: "GET_EVAL: DICT_PATH:DEVICE_INFO.SAMSUNG_CODES.NW_SETTINGS"
            WAIT: 2
```

*FIG. 7A*

```
PROC_NAME:        "GET_NETWORK_PARAMS"
PROC_INFO:        "Get network parameters from engineering code screen"
PROC_VARS:
DUT:
                  'GET_EVAL:DICT_PATH:DEVICE_INFO.UE_MD'
PROC_STEPS:
  -
    SID:          "1"
    STEP_NAME:    "Get_LTE_RSRP_RSRQ_SNR"
    STEP_VARS:
  -
    SID:          "2"
    STEP_NAME:    "Get_LTE_PRC_Band_BW"
    STEP_VARS:
  -
    SID:          "3"
    STEP_NAME:    "Get_LTE_Serving_PLMN"
    STEP_VARS:
```

*FIG. 7B*

```
MESSAGES_CHECK:
    GROUP_ID: "7"
    GROUP_NAME: "MESSAGES CLEAN UP"
    STEPS_RESOURCE: "PERFECTO_REST_API_STEPS"
    PROCEDURES:
        -
            PROC_NAME: "MESSAGES_CLEAN_UP"
            PROC_INFO: "DELETE ALL MESSAGES IN THIS DEVICES"
            PROC_VARS:
            DUT: "EVAL: DICT_PATH:DEVICE_INFO.UE_ID"
            PROC_STEPS:
                -
                    SID: "1"
                    STEP_NAME: "Open_Messages"
                -
                    SID: "2"
                    STEP_NAME: "Click_On_Sender"
                -
                    SID: "3"
                    STEP_NAME: "Press_Native_Button"
                    STEP_VARS:
                        BUTTON: "BACK"
```

FIG. 7C

```
PROC_NAME: "MESSAGES_CLEAN_UP"
PROC_INFO: "DELETE ALL MESSAGES IN THIS DEVICES"
PROC_VARS:
DUT: "GET_EVAL: DICT_PATH:DEVICE_INFO.UE_MO
PROC_STEPS:
-
    SID: "1"
    STEP_NAME: "Check_Messages"
-
    SID: "2"
    STEP_NAME: "Clean_On_Sender"
    STEP_VARS:
    RON_FAIL: "GO_TO: PROC_NAME: DEVICE_CLEAN_UP"; STEP: "2"
    RON_FAIL: "JUMP_TO: STEP: 7"
    VERIFY: ["REGEXP: /alert/" AND "REGEXP: /4370/"],    #Verify on the same line
            ["REGEXP: /alert2/"],                         #Verify in entire output
            ["REGEXP: /alert3/", ["REGEXP: /4370/"]]      #Verify regexp2 in regexp1
            [MATCH: "CONTAINS": "ALL": [val1, val2]]
            [MATCH: "NOT CONTAINS": "EITHER": [val1, val2]]
            [MATCH: "CONTAINS": "2": [val1, val2, val3]]
            [MATCH: "RANGE": [val1, val2]]
            [MATCH: "NOT_IN_RANGE": "DATE_TIME": [val1, val2]]
            [EXTENSION: <function> <arg1,arg2...>]
```

*FIG. 7D*

```
Click_On_Specific_Sender:
    STEP_ID: "24"
    STEP_DESC: ""
    REST_RESOURCE: "executions"
    operation:
        command: "text"
        subcommand: "select"
        PARAM:
            deviceId: "GET_EVAL: DICT_PATH:PROC_VARS.DUT.ID"
            content: "GET_EVAL: DICT_PATH:STEP_VARS.SENDER_VISION"

Press_Native_Button:
    STEP_ID: "27"
    STEP_DESC: ""
    REST_RESOURCE: "executions"
    operation:
        command: "presskey"
        PARAM:
            deviceId: "GET_EVAL: DICT_PATH:PROC_VARS.DUT.ID"
            keySequence: "GET_EVAL: DICT_PATH:STEP_VARS.BUTTON"
```

*FIG. 7E*

```
Get_LTE_Serving_PLMN:
    STEP_ID:        "16"
    STEP_DESC:      "This step gets RSRP value from network setting"
    REST_RESOURCE:  "executions"
    operation:
        command:        "command"
        subcommand:     "application-element"
                        "info"
    PARAM:
        deviceId:   {GET_EVAL: DICT_PATH:PROC_VARS:DUT_ID}
        property:   "text"
        by:         "xpath"
        value:      "//*[text()[contains(.,'Serving PLMN')]]"
```

ZERO CODING AUTOMATION WITH NATURAL LANGUAGE PROCESSING, SUCH AS FOR USE IN TESTING TELECOMMUNICATIONS SOFTWARE AND RESOURCES

CROSS-REFERENCES TO RELATED APPLICATIONS

This application is a continuation of U.S. application Ser. No. 16/595,242, filed on Oct. 7, 2019, and entitled ZERO CODING AUTOMATION WITH NATURAL LANGUAGE PROCESSING, SUCH AS FOR USE IN TESTING TELECOMMUNICATIONS SOFTWARE AND RESOURCES, which claims the benefit of U.S. Provisional Application Ser. No. 62/744,094, filed on Oct. 10, 2018, and entitled ZERO CODING AUTOMATION WITH NATURAL LANGUAGE PROCESSING, SUCH AS FOR USE IN TESTING TELECOMMUNICATIONS SOFTWARE AND RESOURCES, the disclosures of which are hereby incorporated herein in their entireties by reference.

BACKGROUND

An organization typically has several teams of software developers, each of which develops software modules to perform specific functions. These software modules need to be tested before they are deployed in a production environment. A common approach to test software is test automation. In software testing, test automation is the use of special software (separate from the software being tested) to control the execution of tests and the comparison of actual outcomes with predicted outcomes. Test automation can automate some repetitive but necessary tasks in a formalized testing process already in place or add additional testing that would be difficult to perform manually. Different software developer teams develop their own test automation suites, which are customized to test the functionality of their software modules. Even for medium complexity software modules, developing a test automation suite is a time-consuming and computationally-intense process. It typically requires additional manpower in the form of a greater number of software developers as well as increased software coding effort by these developers to write additional software code to test the functionality of the software modules. Additionally, to test one or more software modules, a tester (for example, a person who wishes to test the functionality of a software module) is typically required to understand and write software code. Traditional systems do not enable a lay person, who cannot write software code, to efficiently and effectively test functionality of software modules.

Moreover, the test automation suites for different software modules typically have at least some overlap. For instance, different software modules can include submodules that perform similar functions. As an example, a software module for connecting a VoLTE call using a phone running the Android OS and another software module for connecting a VoLTE call using a phone running iOS will likely have several similar sub-modules (e.g., sub-modules for identifying the mobile device needed to perform the call, sub-modules for identifying the type of call (VoLTE), sub-modules for checking signal quality, and so on). As a result, the test automation suites for testing the functionality of these two software modules will also have several similar testing modules (e.g., testing modules for testing the identification of the mobile device needed to perform the call, testing modules for testing the identification of the type of call (VoLTE), testing modules for testing the checking of signal quality, and so on). Software developers who are creating test automation suites for these two software modules will typically end up developing their own software code across these test automation suites, thus resulting in redundant code and duplicated efforts. Moreover, any changes to the common software functionality will require corresponding changes in each test automation suite, further exacerbating the problems of duplicative efforts. This redundancy can further result in an increased probability of buggy code and unstable software applications.

This redundancy can also result in maintenance problems. For example, different software development teams can maintain the software code using different standards and paradigms, thus requiring non-uniform maintenance efforts. Ownership issues can also arise. Further, legacy (or existing) software code must be maintained, even when new software code modules are developed. This can impact development, quality, flexibility, testing, and maintenance of the new software code modules. All of this results in significantly increased costs both in terms of computing resources and manpower required. And this cost increases yearly.

BRIEF DESCRIPTION OF THE DRAWINGS

Implementations of the disclosed technology will be described and explained through the use of the accompanying drawings.

FIGS. 7A-7F illustrate components of a procedure group in some implementations.

Figure 1:
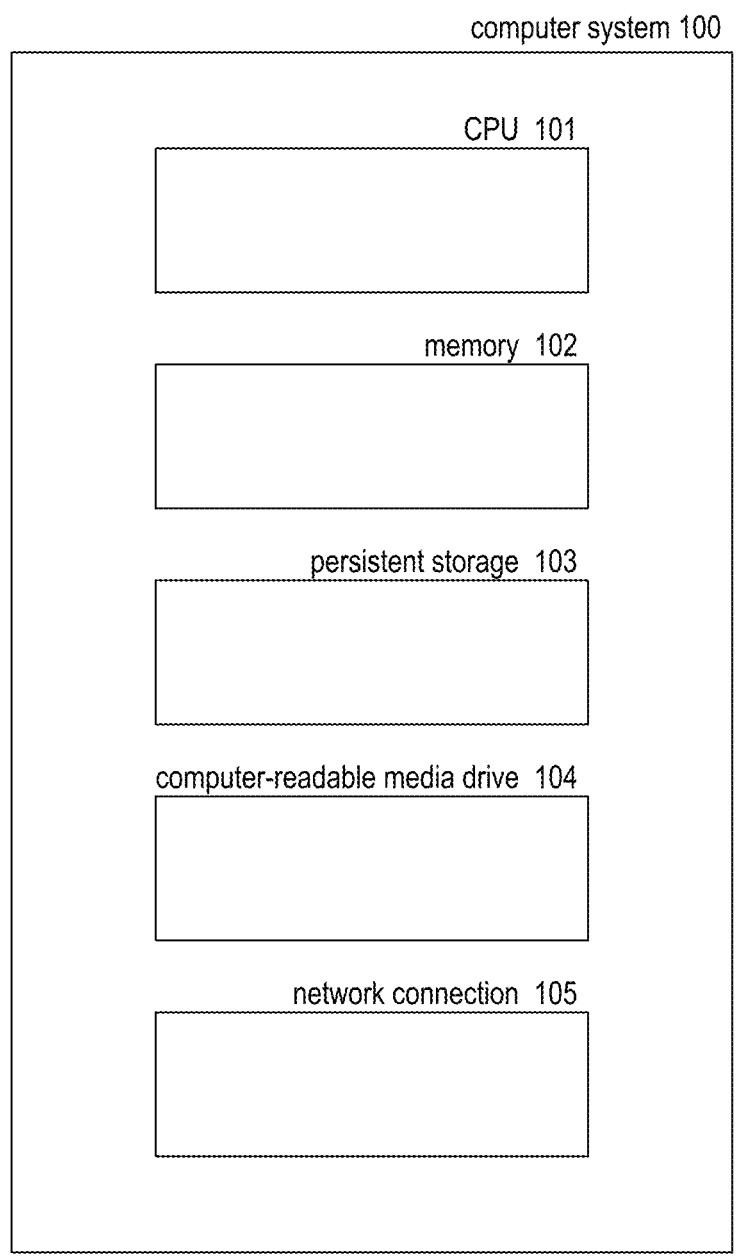
FIG. 1 is a block diagram showing some of the components typically incorporated in at least some of the computer systems and other devices on which zero coding automation systems and methods operate.

The attached Appendix illustrates examples of procedure groups and device steps in some implementations.

The drawings have not necessarily been drawn to scale. Similarly, some components and/or operations can be separated into different blocks or combined into a single block for the purposes of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

In light of the above problems, as well as others, the inventors have recognized that it would be beneficial to provide a framework for automated testing that reuses testing code modules, thereby reducing redundancy and increasing efficiency and productivity. Systems and methods are described herein that provide an end-to-end testing automation framework, which minimizes (and in some cases eliminates) the requirement for testers to write a software code to test software modules (sometimes referred to herein as "zero coding automation system"). The zero coding automation system provides a hierarchical framework to translate testing requests (commands, statements, and so on) received in, for example, regular English (or any other natural/colloquial language), to testing code modules written in, for example, one or more programming languages (for example, tool specific Application Program Interface (API)/ libraries developed to test functionality).

The zero coding automation system can utilize constructs such as complex logic, parsing iterations/loops with conditions, validation criteria, and extensions for new functionality. For example, the zero coding automation system can utilize a serialization language (such as YAML). Even though the zero coding automation system utilizes such constructs, knowledge of these constructs and/or programming skills are not required to utilize the zero coding automation system to perform automated testing of various complex scenarios. Instead, knowledge of a natural language (for example, English) is sufficient to perform such automated testing. In this manner, the zero coding automation system provides a framework that receives testing statements written (and/or spoken) in a natural language and automatically translates them to existing programming language modules, minimizing (and oftentimes eliminating) the need for the tester to have knowledge of any programming language(s) or underlying testing modules to perform the desired testing. Further, the zero coding automation system can utilize various machine learning techniques to further increase the efficiency and accuracy of translating natural language statements to machine-level executable code modules.

In the following description, for the purposes of explanation, numerous specific details are set forth in order to provide a thorough understanding of implementations of the present technology. It will be apparent, however, to one skilled in the art that implementations of the present technology can be practiced without some of these specific details. While, for convenience, implementations of the present technology are described with reference to passive privacy breach notifications, implementations of the present technology are equally applicable creating additional notifications in response to various triggering events.

The techniques introduced here can be embodied as special-purpose hardware (e.g., circuitry), as programmable circuitry appropriately programmed with software and/or firmware, or as a combination of special-purpose and programmable circuitry. Implementations can include a machine-readable medium having stored thereon instructions which can be used to program a computer (or other electronic devices) to perform a process. The machine-readable medium can include, but is not limited to, floppy diskettes, optical disks, compact disc read-only memories (CDROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in several implementations," "in some implementations," "according to several implementations," "in the implementations shown," "in other implementations," and the like generally mean the particular feature, structure, or characteristic following the phrase is included in at least one implementation of the present technology, and can be included in more than one implementation. In addition, such phrases do not necessarily refer to the same implementations or different implementations.

FIG. 1 is a block diagram showing some of the components typically incorporated in at least some of the computer systems and other devices on which the zero coding automation system operates. In various implementations, these computer systems and other devices 100 can include server computer systems, desktop computer systems, laptop computer systems, netbooks, mobile phones, personal digital assistants, televisions, cameras, automobile computers, electronic media players, etc. In various implementations, the computer systems and devices include zero or more of each of the following: a central processing unit ("CPU") 101 for executing computer programs; a computer memory 102 for storing programs and data while they are being used, including the facility and associated data; an operating system including a kernel and device drivers; a persistent storage device 103, such as a hard drive or flash drive for persistently storing programs and data; a computer-readable media drive 104 that has tangible storage means that do not include a transitory, propagating signal, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables, optical fibers, light emitters and receivers, radio transmitters and receivers, and the like. While computer systems configured as described above are typically used to support the operation of the zero coding automation system, those skilled in the art will appreciate that the zero coding automation system can be implemented using devices of various types and configurations, and having various components.

The zero coding automation system can be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules can be combined or distributed as desired in various examples. Aspects of the zero coding automation system can be implemented in hardware using, for example, an application-specific integrated circuit (ASIC) or field programmable gate array ("FPGA").

Figure 2:
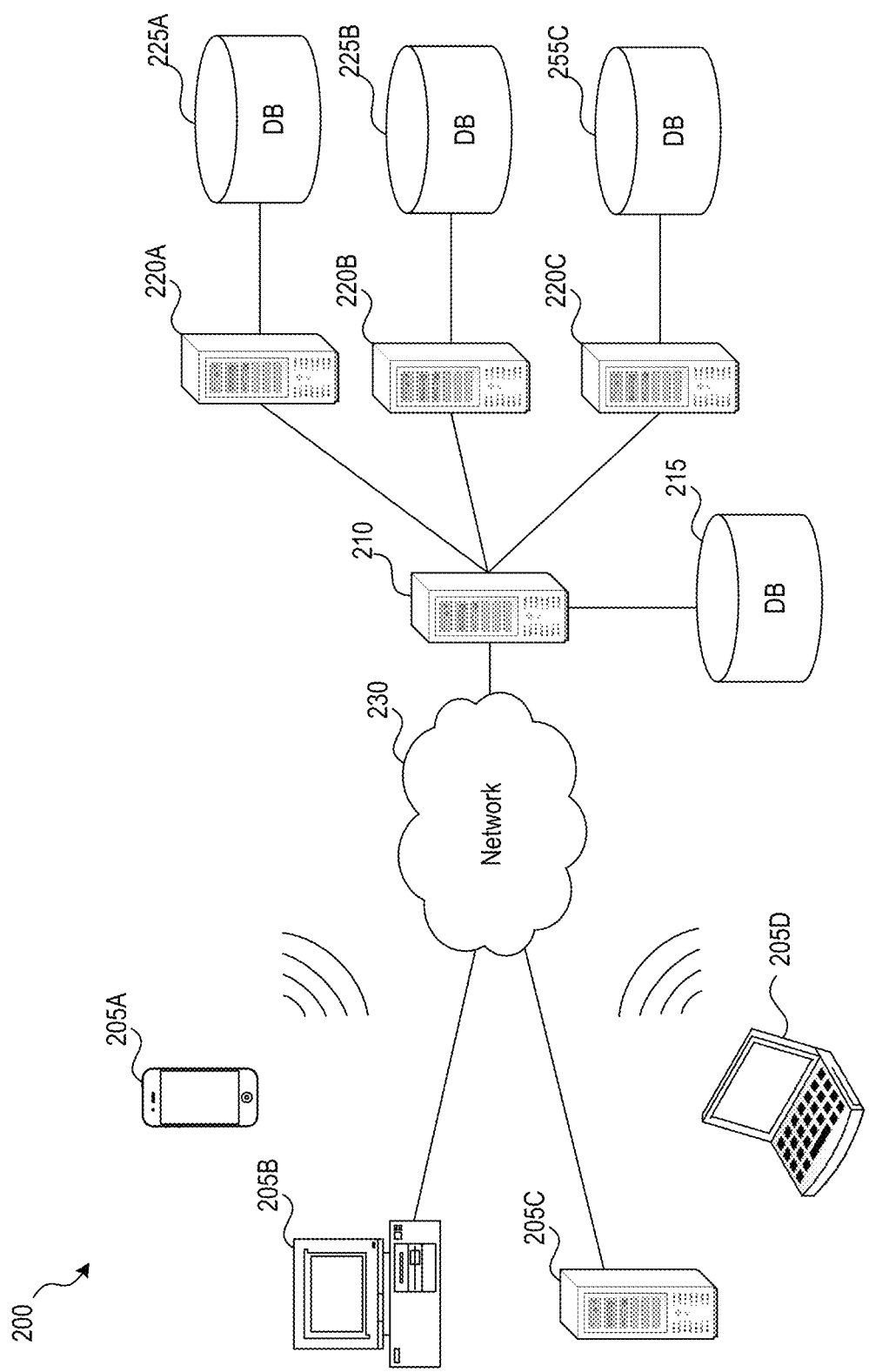
FIG. 2 is a system diagram illustrating an example of a computing environment in which the zero coding automation systems and methods operate in some implementations.

FIG. 2 is a system diagram illustrating an example of a computing environment in which the zero coding automation system operates in some implementations. In some implementations, environment 200 includes one or more client computing devices 205A-D, examples of which can include a computer system 100. Client computing devices 205 operate in a networked environment using logical connections 210 through network 230 to one or more remote computers, such as a server computing device. In some implementations, natural language commands/statements can be received using the one or more client computing device 205A-D.

In some implementations, server 210 is an edge server which receives client requests and coordinates fulfillment of those requests through other servers, such as servers 220A-

C. In some implementations, server computing devices 210 and 220 comprise computing systems, such as computer system 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. In some implementations, servers (210, 220A-C) connect to a corresponding database (215, 225A-C). As discussed above, each server 220 can correspond to a group of servers, and each of these servers can share a database or have its own database. Databases 215 and 225 warehouse (e.g., store) information such as definitions, procedure groups, procedures, tool libraries, modules, and so on. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. In some implementations, network 230 is the Internet or some other public or private network. Client computing devices 205 are connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3A:
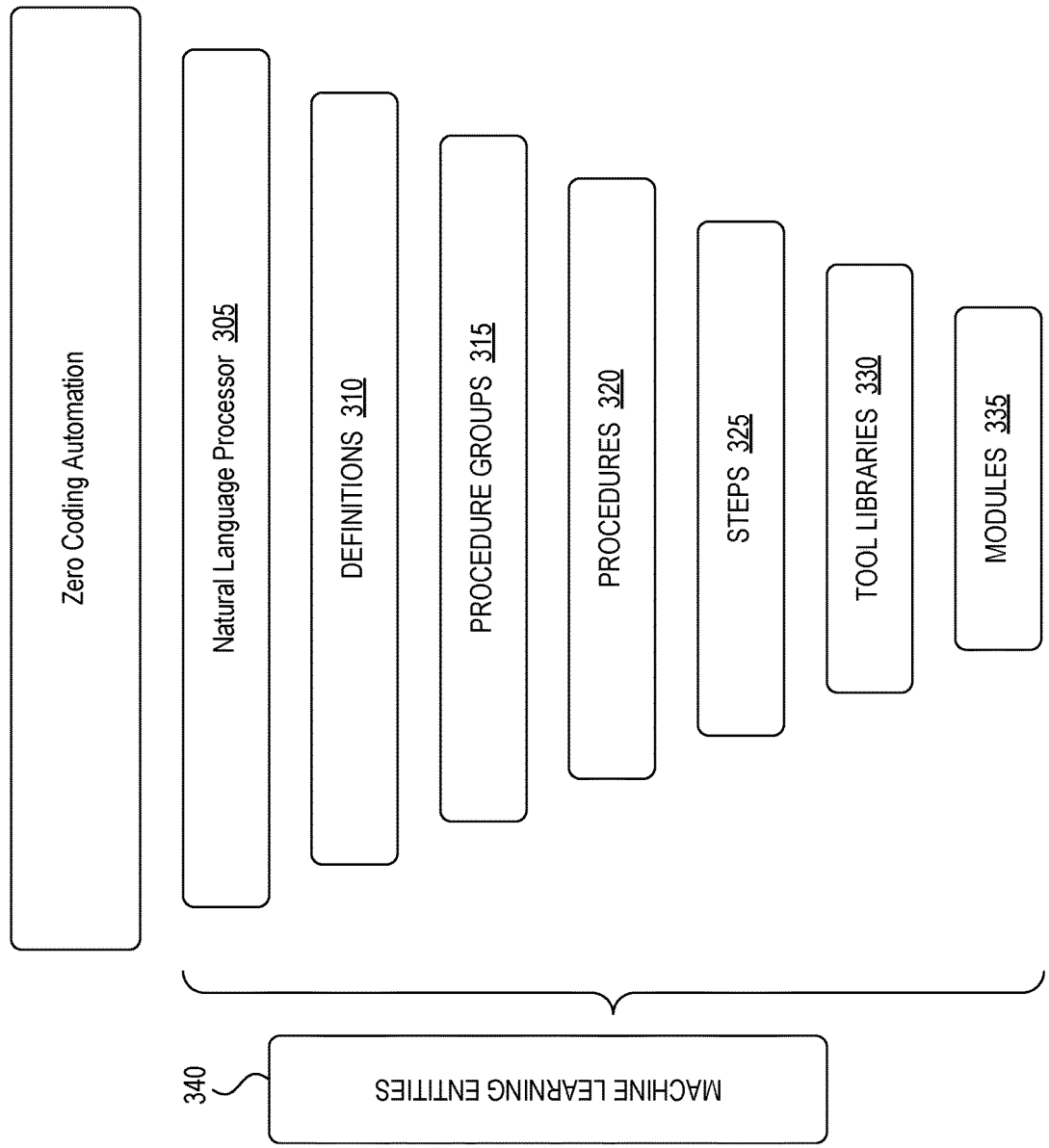
FIGS. 3A and 3B are block diagrams illustrating the various hierarchical levels utilized by the zero coding automation systems and methods in some implementations.
Figure 3B:
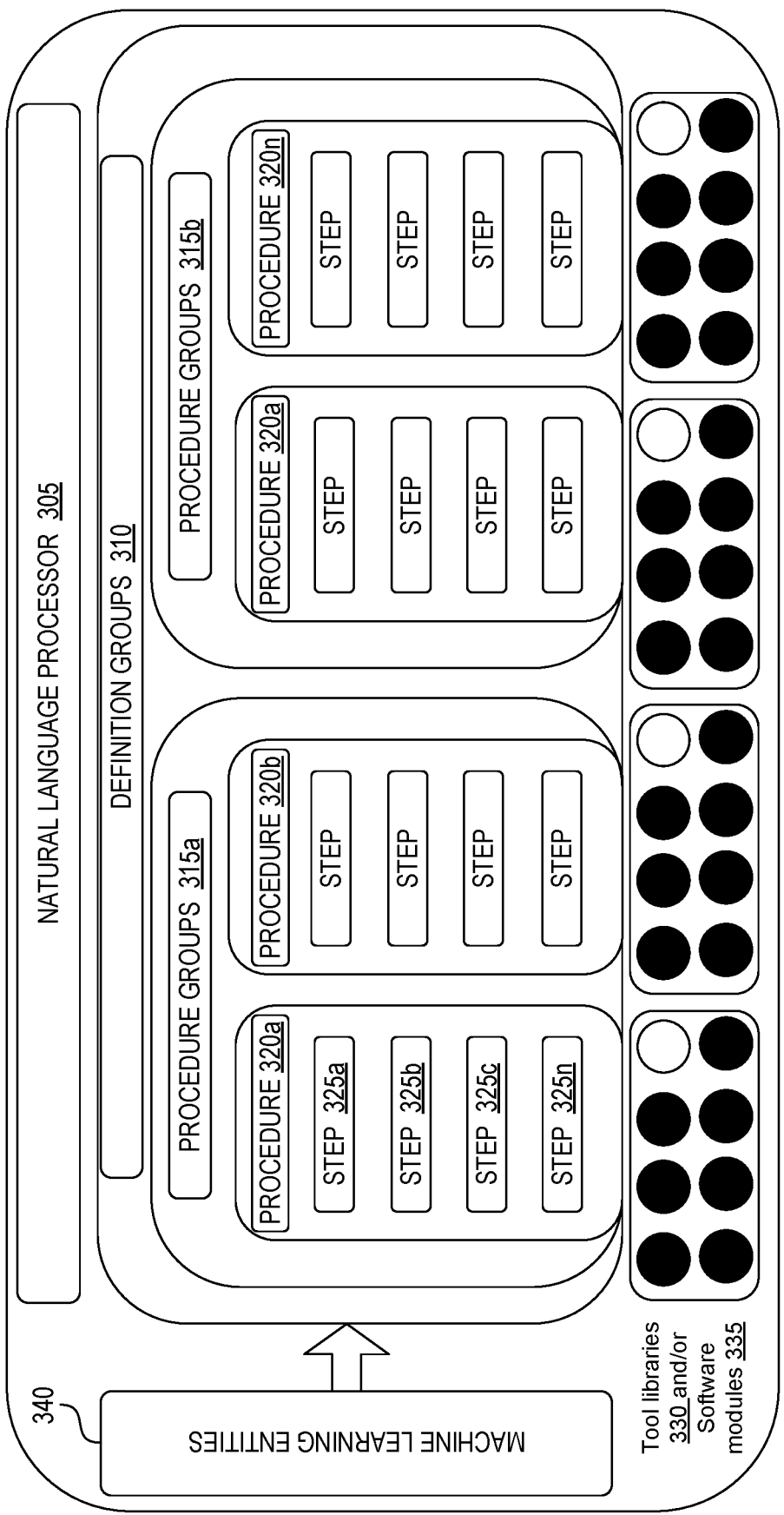

FIGS. 3A and 3B are block diagrams illustrating the various hierarchical levels utilized by the zero coding automation system and method in some implementations. The zero coding automation system receives one or more testing automation commands. These commands can be in, for example, regular English (or any other natural/colloquial language). Examples of programming (and/or testing) requests/commands in regular English include, but are not limited to: 'List' site parameters from 'xxxx' eNodeB in 'JSON' format; 'List' emergency call success rate in South region; 'Upgrade' 'xxxx' site with 'xxxx' code drop located in 'xxxx'; 'Perform' a 'VoLTE' 'call' on 'latest' 'android' 'phone'; 'Capture' diameter messages on 'xxxx' PCRF node from 'xxxx' to 'xxxx' time of MSISDN 'xxxx'; and so on.

The zero coding automation system can utilize one or more Natural Language Processing (NLP) processors 305 to identify one or more parameters (such as, subject(s), predicate(s), action(s), condition(s), context, and so on) associated with a received programming (and/or testing) command in regular English. For example, NLP processor 305 can process the received English command "Validate connectivity with Evolved Node B (eNB) where software has been updated" to identify the following parameters/subjects (and/or values for at least a subset of these parameters): eNBs where software updated and source device using which connectivity is to be tested. The NLP processors 305 can further identify one or more actions/verbs associated with this English command: validate connectivity.

The NLP processors 305 can examine the received programming requests/commands (and/or their identified parameters) to derive constructs from the received programming requests/commands and categorize them into one or more of the following categories: actions, facilitators, resources, parameters, and conditions. The NLP processors 305 can utilize lookup tables to generate/derive the constructs. The NLP processor 305 can utilize one or more voice automation device (e.g., Alexa®, Google Home®, Smart Things®, etc.) libraries to generate/derive the constructs. In several implementations, the constructs derived by the NLP processors 305 use some predefined matches, which result in the same construct for different words. For example, the NLP processors 305 can derive the same construct for the following words: Perform==Execute==Run==Check. The Natural Language Processing (NLP) processors 305 can use linear learning techniques to map a new word to a common construct.

The NLP processors 305 can enhance the mapping of words to constructs using scores. For example, for all words in user supplied English command, if matching procedure group(s) are found, such words (in their respective categories resources, facilitators, actions, etc.) are given a score showing that procedures exist in the zero coding automation system. Existing keyword and acronyms (for example, those defined in 3GPP) are made known or added to the NLP dictionary.

In several implementations, the NLP processors 305 can determine a word's context to derive the constructs. For example, the NLP processors 305 can first derive initial constructs for a word from predefined matches and then derive enhanced constructs by examining one or more words around that word (e.g., by examining preceding words). For example, the NLP processors 305 can first derive the following constructs for the word "call": call==Phone call==Voice Call==Audio Call. But the when the word 'call' is preceded by other words, such as 'VoLTE', 'video', 'Emergency', '911', etc., the NLP processors 305 can derive enhanced constructs based on the preceding words (also called facilitators). For example, the NLP processors 305 can first derive the following constructs for the word "call": call==Phone call==Voice Call==Audio Call. But the when the word 'call' is preceded by other words, such as 'VoLTE', 'video', 'Emergency', '911', etc., the NLP processors 305 can derive enhanced constructs based on the preceding words. Here, 'call' is a facilitator. When a facilitator could not be mapped to a zero coding automation system procedure (for example, FIGS. 3, 320 and 315) then the enhancements engine (FIG. 4, 435) can be used to query the user with questions like: "What type of 'call' is it; available options are audio, video, VoLTE, Emergency?" OR "Did you mean 'video call'?" A user can respond with: "VoLTE."

As another example, the NLP processors 305 maintain the context by keeping track of the last x number of steps/commands (for example, the last 5 steps) performed by the zero coding automation system. In several implementations, the NLP processors 305 maintain context through tagging and/or labeling. For example, the NLP processor can label using the step numbers as an "absolute" reference in the context.

Step 1: Start a VoLTE call using Samsung S10 device
Step 2: Change the radio signal from LTE to 3G
Step 3: Check if the VoLTE call started in Step 1 is up
Step 4: End the call started in Step 1

Table 1 illustrates various constructs derived by the NLP processors 305 for a programming request/command.

TABLE 1

| Programming request/command | Constructs derived by the NLP processors |
|---|---|
| Perform Airplane mode ON and OFF using S9 device | a. Actions => Perform<br>b. Facilitator => Airplane mode<br>c. Resources => device (of type S9)<br>d. Parameters => ON, OFF<br>e. Conditions => None |
| Check VoLTE call is successful using S9 device | a. Actions => Check<br>b. Facilitator => call (of type VoLTE)<br>c. Resources => device (of type S9)<br>d. Parameters => None<br>e. Conditions => successful (call) |
| Check data download is greater than 100 Mbps using S9 device | a. Actions => Check<br>b. Facilitator => download (type data)<br>c. Resources => device (of type S9)<br>d. Parameters => 100 Mbps<br>e. Conditions => greater (>) |
| Perform the last two steps simultaneously using same S9 device | a. Actions => Perform<br>b. Facilitator => Last<br>c. Resources => two steps, device (of type S9)<br>d. Parameters => None<br>e. Conditions => simultaneously, same device<br>f. Context maintained as "relative" reference to the current step |

The zero coding automation system can use the result(s) from the NLP processor 305 to identify one or more zero coding automation definitions 310 corresponding to the received English command. The zero coding automation definitions 310 can be static (e.g., defined using pre-built templates) or dynamic. The zero coding automation system provides the ability to build a template dynamically when there is a matching procedure available for all constructs of a given NLP command. The zero coding automation system can first examine the NLP command to identify values of the constructs. For example, the zero coding automation system examines the NLP command and identifies values for the following constructs: resource(s) and facilitator(s):

| Construct | Examples |
|---|---|
| Resource | Phone/Mobile (e.g., Samsung, Apple, LG, etc.)<br>Network Device (e.g., Cisco software switch, RF switch, etc.)<br>Remote OS (e.g., Linux, Windows, etc.)<br>DB SQL (e.g., MySQL, Oracle, etc.)<br>Selenium Browser (e.g., Chrome, Firefox, IE, Safari, etc.) |
| Facilitator for the Resource "Phone" | Call (make, answer, mute, hold, transfer)<br>Message (send, receive, clear)<br>Network Settings<br>Download<br>YouTube<br>Throughput |

Then, the zero coding automation system dynamically generates a corresponding template as shown below:

| Dynamic Template |
|---|
| procedure_mobile_<samsung>_<s9><br>  1. Mobile related procedure picked up using "Resources"<br>  2. Procedure group is picked up using "Facilitator"<br>  3. Execution form is defined using "Action"<br>  4. Control and result check is included using "Parameters" and "Conditions"<br>  5. Example templates shown in Figures 7A-7F. |

As another example, the following definitions can be identified for the English command "Validate connectivity with eNB where software has been updated": (1) work with eNBs where software has been updated, and (2) test connectivity to these eNBs. The zero coding automation system can translate/associate the programming request/command (and associated definition) to one or more procedure groups 315 (315*a* and 315*b*). In several implementations, the zero coding automation system can compare the "resources" construct derived by the NLP Processors 305 with the description of one or more procedure groups 315. For example, for the programming request/command "Perform Airplane mode ON and OFF using S9 device" discussed above, for which the NLP Processors 305 identify the resource construct "device," the zero coding automation system analyzes the description of various procedure groups and identifies a matching "Devices" procedure group (illustrated in FIGS. 7A-7F). FIGS. 7A-7D illustrate device operations. FIGS. 7E-7F illustrate procedure "steps" (FIG. 3A, 325) that work with "tools libraries" (FIG. 3A, 330).

Each procedure group 315 is associated with one or more procedures 320 (320*a*, 320*b*, ..., 320*n*) whose functionality is defined using procedural steps 325 (325a, 325b, 325c, . . . , 325n). For example, Table 2 lists the procedures and steps associated with the procedure groups illustrated in FIGS. 7A-7D.

TABLE 2

| Procedure Group | Procedure | Procedure Steps |
| --- | --- | --- |
| 5. Network Settings | dial_network_engineering_code | 1. Open Phone |
| | | 2. Open Dialer |
| | | 3. Enter Engineering Code |
| | get_network_parameters | 1. Get_RSRP_RSRQ_SNR |
| | | 2. get_LTE_RRC_Band_BW |
| | | 3. Get_LTE_Serving_PLMN |
| 7. Messages Clean Up | messages_clean_up | 1. Open_Messages |
| | | 2. Click_On_Sender |
| | | 3. Press_Native_Button |

One or more procedures can be shared across multiple procedure groups (for example, 320a is shared between procedure groups 315a and 315b). After identifying a matching procedure group, the zero coding automation system identifies one or more procedures matching the programming request/command. For example, the zero coding automation system can search within the identified procedures group for procedures that match the identified action and/or facilitator constructs. As an example, for the programming command/request "Perform Airplane mode ON and OFF using S9 device," the zero coding automation system identifies a procedure in the "Device" procedure group with a description of (or similar to) "Perform Airplane Mode." The zero coding automation system then passes the appropriate parameters (e.g., "ON" or "OFF") to the identified procedure. The zero coding automation system then executes the steps of the identified procedure. After executing the procedure steps, the zero coding automation system performs any conditions, if any, identified by the derived "conditions" constructs from the received programming requests/commands.

The procedural steps 325 in each procedure 320 correspond to (or map to) one or more tool libraries 330 and/or testing code modules 335. The tool libraries 330 and/or testing code modules 335 can be written in, for example, one or more programming languages (for example, tool specific APIs and/or libraries developed to test specific functionality). In several implementations, the zero coding automation system utilizes mapping functions (for example, mapping tables, translation tables, and so on) to map values from one hierarchical level to another.

Figure 4:
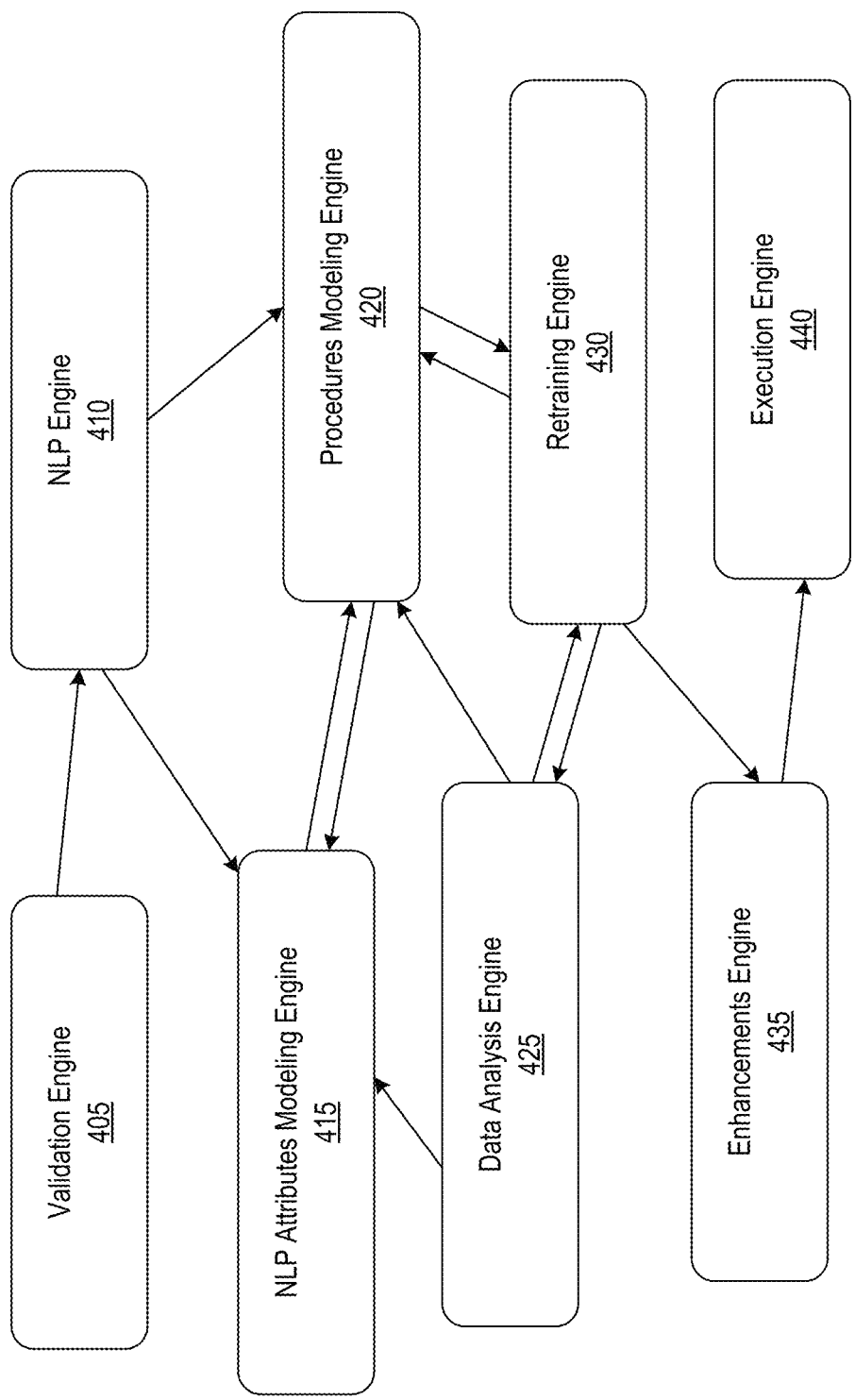
FIG. 4 is a block diagram illustrating examples of machine learning entities and their interactions in some implementations.

Further, the zero coding automation system can utilize various machine learning techniques/entities 340 to further enhance the efficiency and/or accuracy of translating natural language statements to machine-level executable code modules. FIG. 4 is a block diagram illustrating examples of machine learning entities and their interactions in some implementations. A validation engine 405 examines the received natural language commands/statements to verify that the received commands are in the proper format (for example, at least one sentence long), have the proper syntax, can be processed by the zero coding automation system, include the necessary (or minimum set of) data/information, and so on. Alternatively or additionally, when the validation engine 405 determines that additional information/details are required regarding a received natural language commands/statements, the validation engine 405 can interact with a user by querying for the missing information/details or presenting relevant examples/references that facilitate the user in providing the missing additional information/details.

The validation engine 405 can examine the list of parameters required by the identified procedures, and when it determines that values for the necessary parameters are not identified, it determines that additional information/details are required regarding the received requests/command/statement. For example, for the received request "Check VoLTE call is successful using S9 device," the validation engine determines that the following details are missing: the duration of the call and the recipient device number.

An NLP engine 410 derives one or more subjects, predicates, actions, conditions, context, and so on from the received natural language commands/statements. The NLP engine 410 can utilize existing NLP products, such as GOOGLE Cloud Natural Language API to analyze the received commands/statements and derive one or more of the above listed attributes. The NLP engine 410 can be trained using an NLP attributes modeling engine 415 that comprises models (such as decision trees, neural networks, and so on) for modeling attributes corresponding to natural language commands. The NLP engine 410 can first be trained on a known universe of natural language commands and their corresponding attributes (for example, subjects, predicates, actions, conditions, context, and so on). The trained NLP engine 410 is then used by the zero coding automation system to identify optimized definitions for a received natural language command. In several implementations, the (trained and/or untrained) NLP engine 410 receives feedback from other components of the zero coding automation system to further fine tune and adapt the functioning of the NLP engine 410. For example, a variance between the actual versus expected definitions identified for a received natural language command can be used to further train and fine-tune the NLP engine 410. Examples of the trained NLP engine 410 include, but are not limited to, customized engines utilizing processing techniques suitable for the telecommunications industry (e.g., with standards complying to 3GPP protocols and terminology).

A procedures modeling engine 420 trains one or more models that help identify values (actionable-steps) of entities in the different hierarchical levels utilized by the zero coding automation system. For example, the procedures modeling engine 420 can use a decision tree model to identify/label optimum definition(s), procedure group(s), and/or procedure(s) associated with the received natural language command and associated definition(s). Alternatively or additionally, the procedures modeling engine 420 tracks frequently used definitions along with contextual parameters and data entities.

A data analysis engine 425 evaluates data sets to compute and/or re-compute values for one or more parameters used by the other engines utilized by the zero coding automation system. Examples of data sets include but are not limited to data used to train the models of the NLP attributes modeling engine 415, procedures modeling engine 420, translated values generated for one or more hierarchical levels utilized by the zero coding automation system, and so on. Examples of parameters include but are not limited to weights, biases, adjustment factors, scores, and so on, which are used by the different engines to identify the appropriate translated/mapped values at the different hierarchical levels utilized by the zero coding automation system. Alternatively or additionally, the data analysis engine 425 provides new definitions or learns updated definitions from the retraining engine 430. Any misses are recorded along with the context to request the retraining engine 430 and promote the need for enhancements. In several implementations, the data analysis engine 425 defines sampling data and how the NLP attributes modeling engine 415 needs to function. The data analysis engine can update look-up tables in NLP attributes modeling engine 415 and provides information related to the constructs of tools/libraries that execution engine 440) understands.

The parameter values computed by the data analysis engine 425 can further be used by the retraining engine 430 to evaluate and/or retrain the different models (for example, those used by the NLP attributes modeling engine 415 and/or procedures modeling engine 420) to improve prediction efficiency and optimize results. For instance, in several implementations, one or more of the different engines utilized by the machine learning techniques/entities 340 provide feedback to each other to further enhance their functioning (and the results generated by the engines). The retraining engine 430 updates sampling data to further optimize the translations performed by the zero coding automation system. An example optimization is when an English command found could not clearly distinguish the constructs (action, facilitator, resource, parameter, condition) and resulted in a query(ies). If the user's response results in distinguishing the 5 categories in English command then data analysis engine 425 is optimized with new mappings. Enhancements engine 435 utilizes other algorithms (for example, custom developed search algorithms, tags, suggestions, and so on) to further optimize these translations. For example, the enhancements engine 435 presents suggestions to a user related to one or more translations. Based on whether the user accepts or rejects or accepts-in-part some (or all) of the suggested translations, the enhancements engine 435 optimizes the translations. Alternatively or additionally, the enhancements engine 435 works out-of-band but within the boundary of its format, definitions, data-types, etc. This helps in absorbing enhancements via crowd souring that the retraining engine 430 can ask. The enhancements engine 435 plays a significant bridge for procedure modeling because it adapts to the constantly changing telecommunications industry, which regularly produces new technologies, new functionalities, and tools to use them.

An execution engine 440 executes and fills automation gaps, as needed. In several implementations, one or more engines of the machine learning entities use crowdsourcing to provide further automation in the zero coding automation system. Any automation or related work done can be absorbed by the zero coding automation system through the enhancements engine 435 and appraised via the retraining engine 430. Development from crowd souring can come from other teams, vendors, open source community, freelancers, contractors, and so on. The enhancements engine 435 evaluates and incorporates crowd source developments so that they are understandable by the retraining engine 430.

Figure 5:
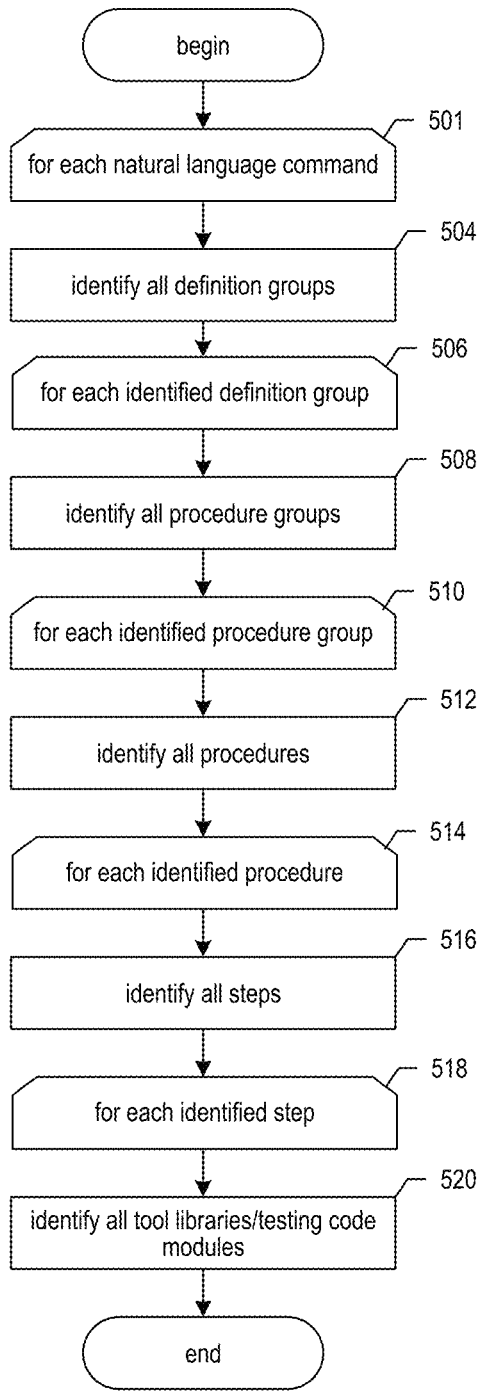
FIG. 5 is a flow diagram illustrating a method of translating a natural language statement to testing code modules in some implementations.

FIG. 5 is a flow diagram illustrating a process of translating a natural language command/statement to testing code modules using, for example, the hierarchical levels illustrated in FIGS. 3A-3B, in some implementations. In block 501, the zero coding automation system loops through each received natural language command/statement. For example, the system can receive a natural language command "Validate connectivity with eNB where software has been updated." In block 504, the zero coding automation system identifies one or more definition groups 310 corresponding to a natural language command/statement. For example, the following definitions can be identified for the English command "Validate connectivity with eNB where software has been updated": (1) work with eNBs where software has been updated, and (2) test connectivity to these eNBs. In block 506, the zero coding automation system loops through each identified definition group 310. In block 508, the zero coding automation system identifies one or more procedure groups 315 corresponding to an identified definition group 310. For example, the following procedure groups are identified for these definitions: identify all eNBs in a geographic region; of the identified eNBs, identify eNBs where software has been updated; identify required and/or optional parameters for the request; identify vendor(s) for the eNBs; identify technology of the eNBs; and so on. In block 510, the zero coding automation system loops through each identified procedure group 315. In block 512, the zero coding automation system identifies one or more procedures 320 corresponding to an identified procedure group 315. For example, for procedure group "identify all eNBs in a geographic region," the following procedures are identified: retrieve set of eNBs; determine location(s) of eNBs; and filter eNBs by location to select eNBs in the geographic location. In block 514, the zero coding automation system loops through each identified procedure 320. In block 516, the zero coding automation system identifies one or more steps 325 corresponding to an identified procedure 320. For example, for procedure "retrieve set of eNBs," the following steps are identified: access data storage location; execute query to retrieve information about eNBs; and return results of query execution. In block 518, the zero coding automation system loops through each identified step 325. In block 520, the zero coding automation system identifies one or more tool libraries 330, testing code modules 335, etc. corresponding to an identified step. The identified tool libraries 330, testing code modules 335, etc. can be existing software code modules. These modules can be used by one or more different steps, and can thus be reused across different testing commands/statements. In this manner, the zero coding automation system leverages existing code modules and reduces the overhead and costs required to maintain different code modules to perform similar blocks or acts.

Figure 6:
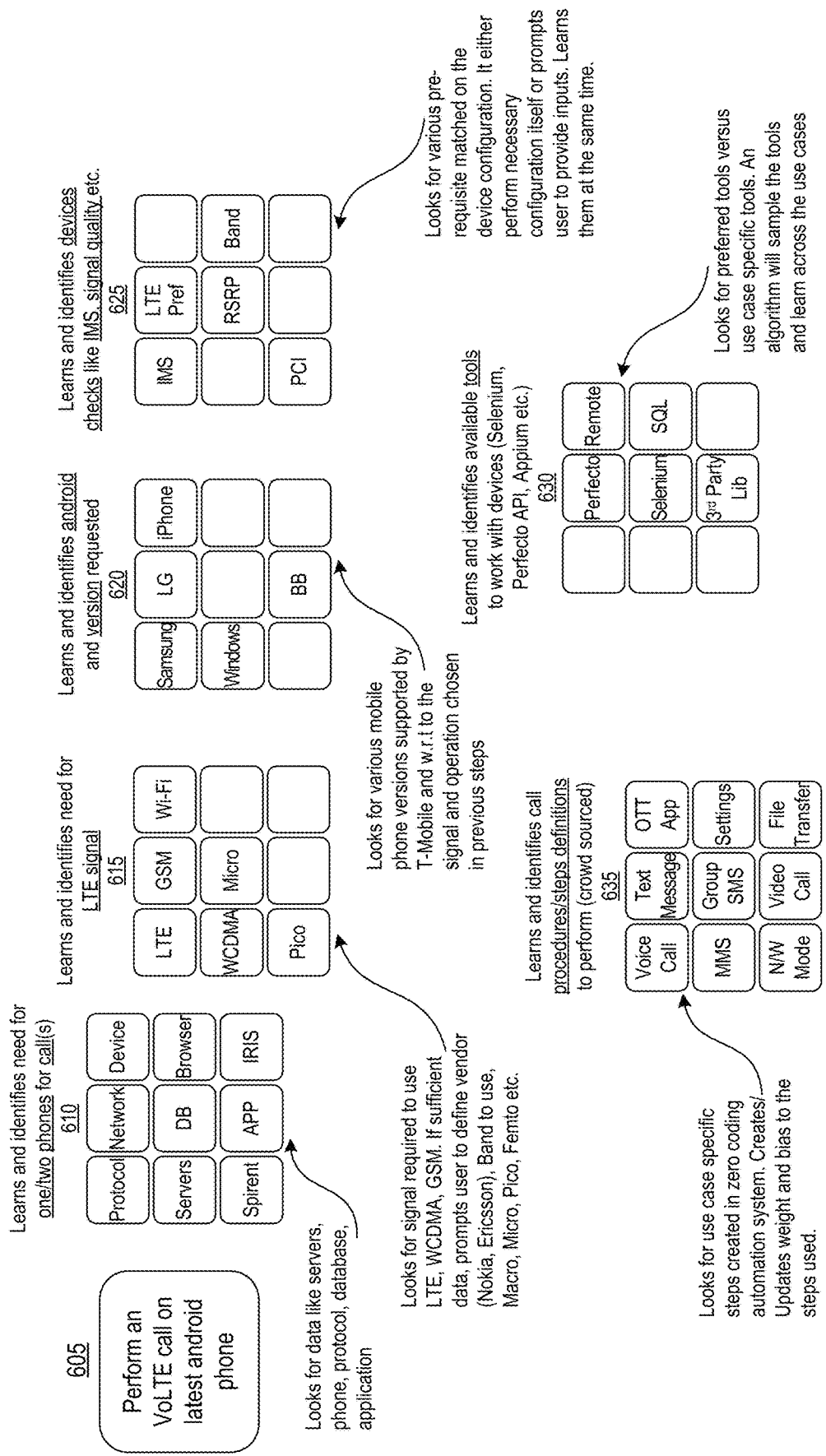
FIG. 6 is a use case diagram illustrating translation of a natural language statement to testing code modules in some implementations.

FIG. 6 is a use case diagram illustrating in detail an example of translating a natural language statement testing code module. Upon receiving a natural language command/statement 605 ("Perform an VoLTE call on latest android phone"), the zero coding automation system validates the received command (for example, via the validation engine 405). The coding automation system then learns and identifies various parameters (such as, subject(s), predicate(s), action(s), condition(s), context, and so on) associated with the received natural language command/statement 605 by applying a multi-sectional attribute matrix. Each section of the multi-sectional attribute matrix comprises one or more subsections, each of which can correspond to one or more keywords. The number of sections and/or subsections in the multi-sectional attribute matrix can expand or contract based on use cases supported by the zero coding automation system. In several implementations, the sections and/or subsections can be determined based on input received from various machine learning entities (for example, illustrated in FIG. 4). In several implementations, based on one or more sections and/or subsections for which a match is found, other sections and/or subsections can be selected (and/or suggested) or disregarded. Each section and/or subsection can be associated with a set of criteria (for example, subject, predicate, actions, conditions, context, tags, and so on) to determine whether the section and/or subsection applies to a received natural language command.

FIG. 6 illustrates a use case where a multi-sectional attribute matrix can be represented as a cube where each of the six sections/faces comprises nine subsections. The zero coding automation system applies a first section/face of the multi-sectional attribute matrix to the received natural language command. For example, the zero coding automation system parses the received command and applies a first section of the multi-sectional attribute matrix to determine the resources required by the command (block 610). To do so, the zero coding automation system determines whether the received command contains certain keywords corresponding to the subsections (for example, protocol, network, device, servers, database, browser, testing modules (for example, Spirent®), application, network analyzer tools (for example, IRIS®), and so on) on the first face/section of the cube. In the example illustrated in FIG. 6, the zero coding automation system determines that the received command contains the words "call" and "phone" that correspond to the subsection "Device" on the first face of the cube.

After identifying one or more keywords (for example, "Device") in the received natural language command/statement, the zero coding automation system determines other attributes or parameters associated with the identified keyword based on the received command. For example, the zero coding automation system determines whether one or two devices are required to execute the received command. As an example, the zero coding automation system can determine that the VoLTE call is being made to another mobile device, in which case two devices are required, or that the VoLTE call is being made to a VoIP number, in which case only one mobile device (the calling device) can be required (the called device can be a laptop). In several implementations, when the zero coding automation system determines that it has not received values for one or more required (or optional) attributes or parameters associated with the received command, it can use other factors, such as context information, past user input/commands, other related commands, etc. to predict those values. In several implementations, the zero coding automation system presents the predictions to users as suggested values for their selection.

The zero coding automation system then applies another section of the multi-sectional attribute matrix to determine the signal(s) required by the command (block 615). To do so, the zero coding automation system determines whether the received command contains certain keywords corresponding to the subsections (for example, LTE, GSM, Wi-Fi, WCDMA, Micro, Pico, and so on) on the second face/section of the cube. In the example illustrated in FIG. 6, the zero coding automation system determines that the received command contains the word "VoLTE" that corresponds to the subsection "LTE" on the second face of the cube. The zero coding automation system then repeats this process by applying different sections of the multi-sectional attribute matrix to determine the software requirements (block 620), device checks (block 625), tools (block 630), and definitions/procedure groups/procedures/steps (block 635).

From the foregoing, it will be appreciated that specific implementations of the invention have been described herein for purposes of illustration, but that various modifications can be made without deviating from the spirit and scope of the invention. Accordingly, the invention is not limited except as by the appended claims.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative implementations can perform routines having steps, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

What is claimed is:

1. A computer-implemented method for performing zero coding automation with natural language processing for use in testing software, the method comprising:
   determining a set of constructs from a natural language command,
     wherein the set of constructs comprises a facilitator construct associated with a facilitator in the natural language command, the facilitator construct having one or more potential values;
   evaluating one or more words in the natural language command to select, from the one or more potential values, a particular value of the facilitator construct,
     wherein the one or more words include an additional facilitator that occurs before or after the facilitator in the natural language command;
   extracting values of the set of constructs, the extracted values including the particular value of the facilitator construct;
   comparing the extracted values of the set of constructs against values of one or more definitions to identify a matching definition for the natural language command;
   identifying a procedure corresponding to the matching definition for the natural language command,
     wherein the procedure is associated with at least one step or operation, and
     wherein the at least one step or operation is associated with a tool library or software code module; and
   causing the tool library or software code module to be executed based on the natural language command.

2. The computer-implemented method of claim 1, wherein information of the procedure comprises: a procedure identifier, a procedure name, a procedure description, procedure variable, or any combination thereof.

3. The computer-implemented method of claim 1, wherein information of the step or operation comprises: a step or operation identifier, a step or operation name, at least one step or operation variable, or any combination thereof.

4. The computer-implemented method of claim 1, wherein the tool library or software code module is written in a programming language.

5. The computer-implemented method of claim 1, wherein the one or more definitions are generated dynamically based on the extracted values of the set of constructs.

6. The computer-implemented method of claim 1 further comprising:
   parsing and validating the natural language command based on a set of validation criteria.

7. The computer-implemented method of claim 1 further comprising:
   parsing and validating the natural language command based on a set of validation criteria to identify a parameter of the procedure whose value is missing from the received natural language command.

8. The computer-implemented method of claim 1 further comprising:
   accessing a data storage location to retrieve potential values of constructs in the set of constructs, wherein at least some of the potential values resolve to a same common value.

9. At least one non-transitory computer readable medium storing instructions, which when executed by at least one computing device, perform a method of analyzing software, the method comprising:
   determining a set of constructs from a natural language command,
     wherein the set of constructs comprises a facilitator construct associated with a facilitator in the natural language command, the facilitator construct having one or more potential values;
   evaluating one or more words in the natural language command to select, from the one or more potential values, a particular value of the facilitator construct,
     wherein the one or more words include an additional facilitator that occurs before or after the facilitator in the natural language command;
   extracting values of the set of constructs, the extracted values including the particular value of the facilitator construct;
   comparing the extracted values of the set of constructs against values of one or more definitions to identify a matching definition for the natural language command;
   identifying a procedure corresponding to the matching definition for the natural language command,
     wherein the procedure is associated with at least one step or operation, and
     wherein the at least one step or operation is associated with a tool library or software code module; and
   causing the tool library or software code module to be executed based on the natural language command.

10. The computer-readable medium of claim 9, further comprising:

maintaining a context for the natural language command or the at least one step or operation,
wherein maintaining the context includes tracking one or more other natural language commands or one or more other step or operations; and
updating an extracted value of the set of constructs based at least in part on, the maintained context for the natural language command or the at least one step or operation.

11. The computer-readable medium of claim 9, wherein information of the procedure group comprises: a procedure group identifier, a procedure group name, a procedure group description, procedure group resource, or any combination thereof.

12. The computer-readable medium of claim 9, wherein information of the procedure comprises: a procedure identifier, a procedure name, a procedure description, procedure variable, or any combination thereof.

13. The computer-readable medium of claim 9, wherein information of the step or operation comprises: a step or operation identifier, a step or operation name, at least one step or operation variable, or any combination thereof.

14. The computer-readable medium of claim 9, wherein the tool library or software code module is written in a programming language.

15. The computer-readable medium of claim 9, wherein the one or more definitions are generated dynamically based on the extracted values of the set of constructs.

16. The computer-readable medium of claim 9 further comprising:
parsing and validating the received natural language command based on a set of validation criteria.

17. The computer-readable medium of claim 9 further comprising:
accessing a data storage location to retrieve potential values of constructs in the set of constructs, wherein at least some of the potential values resolve to a same common value.

18. At least one non-transitory computer readable medium storing instructions, which when executed by at least one computing device, perform a method for performing zero coding automation with natural language processing for use in analyzing software, the method comprising:

analyzing a received natural language command based on a set of validation criteria;
identifying a set of keywords associated with the received natural language command;
updating a facilitator in the set of keywords based at least in part on evaluating an additional facilitator occurring before or after the facilitator in the received natural language command;
identifying a set of sections applicable to the received natural language command,
wherein each section in the set of sections comprises at least one subsection;
for each section in the set of sections:
comparing at least one keyword in the set of keywords associated with the received natural language command to at least one subsection in the section; and
when a match is found, updating a data structure with the matching subsection; and
identifying a definition based on the data structure comprising the matching subsections,
wherein the definition is associated with at least one procedure group,
wherein the at least one procedure group is associated with at least one procedure,
wherein the at least one procedure is associated with at least one step or operation, and
wherein the at least one step or operation is associated with at least one tool library or software code module.

19. The computer-readable medium of claim 18, wherein the at least one tool library or software code module is written in a programming language.

20. The computer-implemented method of claim 1, further comprising:
querying a user for information related to the facilitator construct; and
receiving user input from the user in response to the query,
wherein selection of the particular value of the facilitator construct is further based on the user input.

* * * * *